United States Patent [19]
Mecca

[11] 3,756,002
[45] Sept. 4, 1973

[54] CONVEYOR MEANS FOR HARVESTING MACHINES

[75] Inventor: Vito M. Mecca, North Collins, N.Y.

[73] Assignee: Mecca Bros. Inc., North Collins, N.Y.

[22] Filed: July 23, 1971

[21] Appl. No.: 165,082

[52] U.S. Cl. .................................. 56/330, 198/145
[51] Int. Cl. ............................................ A01g 19/00
[58] Field of Search ........................... 56/328, 330; 198/140, 141, 144, 145, 146

[56] References Cited
UNITED STATES PATENTS

| | | | |
|---|---|---|---|
| 2,435,498 | 2/1948 | Hapman | 198/145 |
| 3,385,042 | 5/1968 | Christie et al. | 56/330 |

Primary Examiner—Russell R. Kinsey
Attorney—Conrad Christel and Edwin T. Bean, Jr.

[57] ABSTRACT

A conveyor system for harvesting machines comprising a plurality of pivotally supported buckets, of relatively rigid and nonporous material such as metal or plastic, adapted to be moved through an endless path. The path includes spaced-apart horizontal and vertical portions each defined by spaced apart and parallel rail members fixed to the machine frame. Each bucket is supported in a position for carrying crops along portions of the path by means of a rod rotatably connected to the bucket and having bearing means or rollers mounted at each end thereof for engaging the rails. Each bucket is pivoted to a position for discharging crops along other portions of the path by means carried by the bucket which engages a rail in a manner pivoting the bucket about the rod.

12 Claims, 8 Drawing Figures

INVENTOR.
VITO M. MECCA

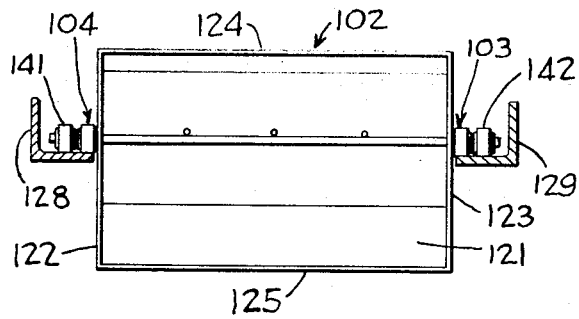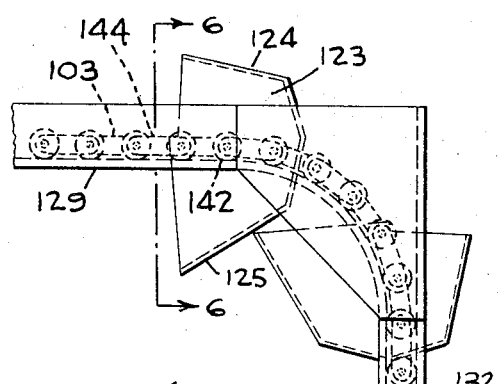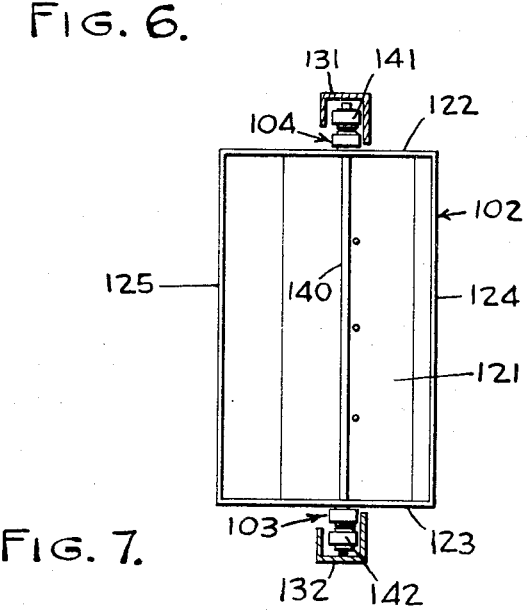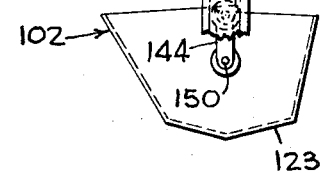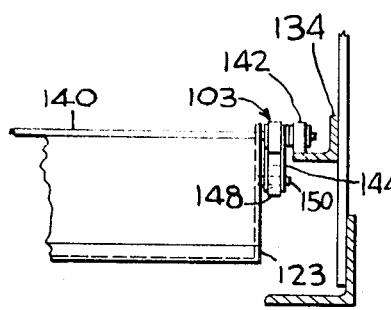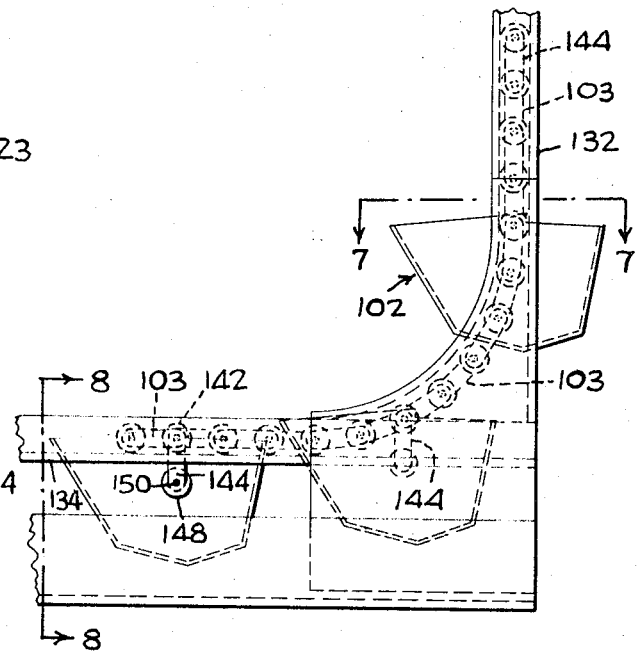

CONVEYOR MEANS FOR HARVESTING MACHINES

BACKGROUND OF THE INVENTION

This invention relates to harvesting machines and, more particularly, to a conveyor system for use in such machines.

One area of use of the present invention is in machines for harvesting crops from bushes or vines planted in rows. In such machines it is often desired to convey the harvested crops, for example grapes, from one area of the machine, often near the bottom, to another area such as the top of the machine, where the crops are collected. An important requirement on the design of a conveyor for harvesting machinery is that it remain clean during reasonably long periods of operation. Otherwise the efficiency of the harvesting operation will be reduced significantly if the machine must be stopped frequently for cleaning of the conveyor.

Conveyors made of rubber, fabric or other relatively porous material readily absorb dirt and dust from the field as well as any liquid which is expelled from crops of the soft variety, for example grapes, by the forces associated with mechanical harvesting. Such conveyors quickly become dirty and thus require frequent cleaning when in use.

A conveyor made from relatively rigid and nonporous material, such as metal, would be highly desirable in requiring less frequent cleaning while in use. In addition a harvesting machine conveyor of such material also must satisfy the same requirements imposed on the design of conveyors heretofore available. Some of these requirements are little or no crop loss or spillage during conveyance to the machine collecting area, simple construction, and maximum conveyor working length for a given machine size.

SUMMARY OF THE INVENTION

The present invention provides a novel conveyor system for harvesting machines including a plurality of pivotally supported buckets, preferably of metal, adapted to be moved through a path. The path advantageously includes spaced-apart horizontal and vertical portions. The buckets are supported in a crop carrying position while being moved through one portion of the path, and are pivoted to a position for discharging crops through another portion of the path.

By way of illustration the present invention will be described with particular reference to harvesting machinery of the type wherein crops growing on bushes or vines planted in rows are agitated, although the principles of the invention may be variously applied. While a single specific embodiment of the principles of the present invention is illustrated in the accompanying drawing and described in detail in the following specification, it is to be understood that such embodiment is by way of example only and that various mechanical modifications may be made without departing from the spirit of the invention.

BRIEF DESCRIPTION OF THE DRAWING FIGURES

FIG. 4 is an enlarged fragmentary elevational view of the portion of the conveyor system shown in the upper right-hand portion of FIG. 2;

FIG. 5 is an enlarged fragmentary elevational view of the portion of the conveyor system shown in the lower right-hand portion of FIG. 2;

FIG. 6 is a fragmentary elevational view taken about on line 6—6 in FIG. 4;

FIG. 7 is a fragmentary plan view taken about on line 7—7 in FIG. 5; and

FIG. 8 is a fragmentary elevational view taken about on line 8—8 in FIG. 5.

DETAILED DESCRIPTION OF THE ILLUSTRATED EMBODIMENT

Figure 2:
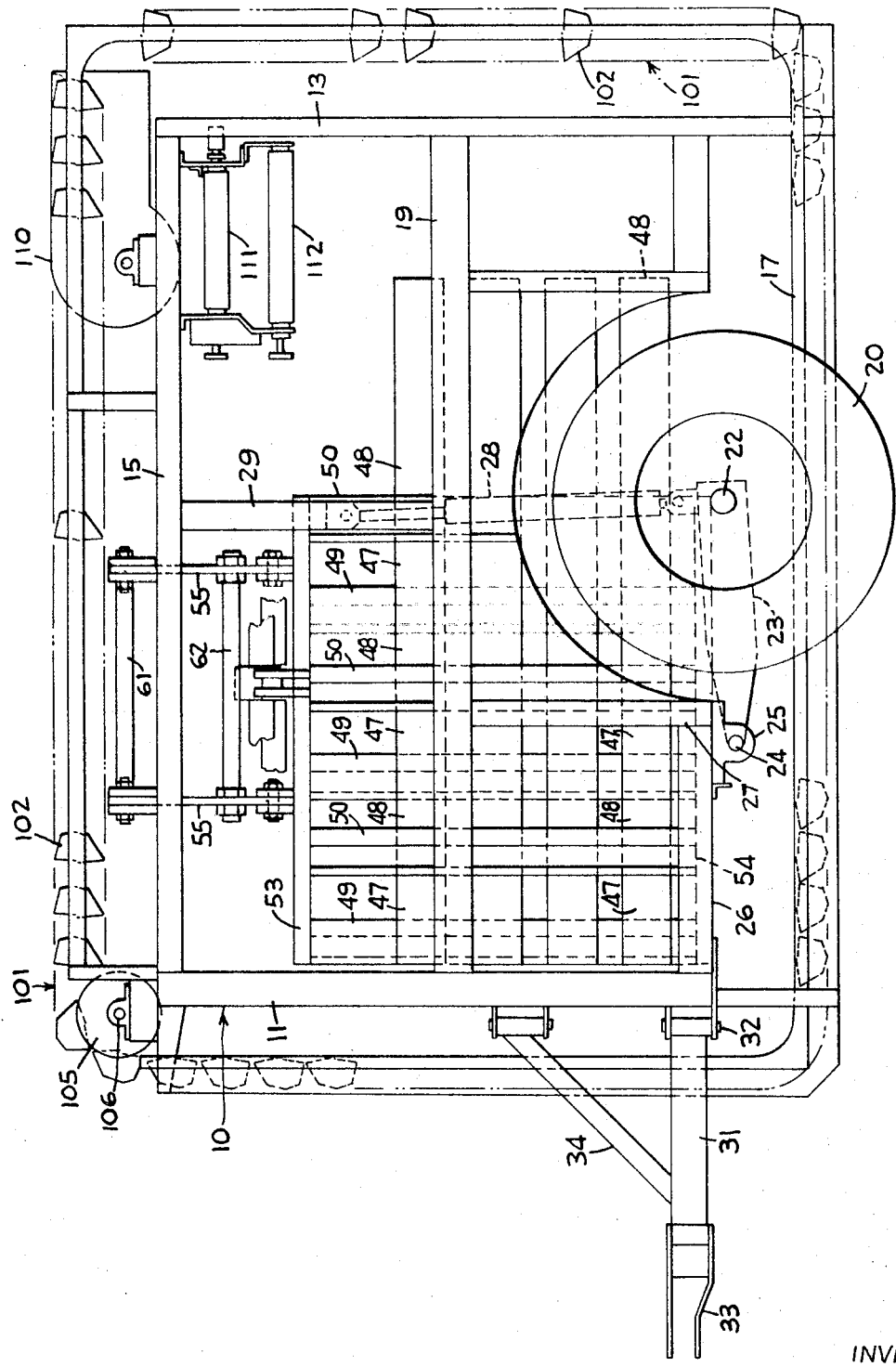
FIG. 2 is a fragmentary side elevational view of the harvesting machine of FIG. 1.

A harvesting machine of the present invention includes an ambulatory supporting frame 10 which is adapted for longitudinal movement along a row of plants. The frame includes, briefly, vertical end members 11–14 and upper and lower generally horizontal side members 15, 16 and 17, 18, respectively, as shown more clearly in FIG. 2. An intermediate side frame member is also included, one being shown at 19 in FIG. 2. The frame members thus are arranged so as to enable the machine to straddle a row of plants or vines as it is moved longitudinally along the row. A pair of wheels 20, 21 each are connected to the frame 10 in a rotatable, shock-absorbing manner. As shown in FIG. 2, wheel 20 is rotatably connected through an axle 22 to a link or connecting member 23, which is pivotally connected at 24 to a bracket 25. The bracket, in turn, is fixedly attached to auxiliary frame members 26, 27 which are rigidly attached to the frame members 11, 19 respectively. The link 23 is also connected to one end of a hydraulic cylinder 28, the piston rod of which is pivotally connected to a depending frame member 29 fixedly attached to frame member 15. Wheel 21 is connected rotatably and in a shock-absorbing manner to the frame 10 by a similar arrangement included on the other side thereof.

The machine provided by the present invention is of the type adapted to be moved along a row of plants by a separate vehicle, for example, a tractor. A suitable arrangement thus is provided for connecting the frame 10 to the vehicle which will draw it. As shown in FIG. 2, a generally horizontal bar 31 is connected through a suitable bracket 32 to one of the frame members and near the lower portion of frame 10. A conventional hitch 33 is included on bar 31 for connection to the vehicle, and preferably a supporting arm 34 is connected at one end to bar 31 and at the other end through a bracket 35 to frame 10.

The harvesting machine further comprises crop removing means in the form of shaker means, generally designated 40, carried by the machine frame 10 and including a plurality of foliage agitating members or beater elements which extend from opposite sides of the machine toward opposite sides of a row of plants when the machine is moved along the row. In the present illustration the foliage agitating members or beater elements comprise plates or slats 47 and 48 extending inwardly from opposite sides of the machine to bear against the foliage. The slats 47 at the left-hand side of the machine as viewed in FIGS. 1–3 comprise three vertical series, with each vertical series fixed to an angle member 49 which is fixed at its upper and lower ends to longitudinally extending beams 51 and 52, respectively. Similarly, the beater elements 48 at the opposite side of machine are likewise fixed to vertical angle members 50 which are fixed at their upper and lower ends to beams 53 and 54, respectively.

Figure 3:
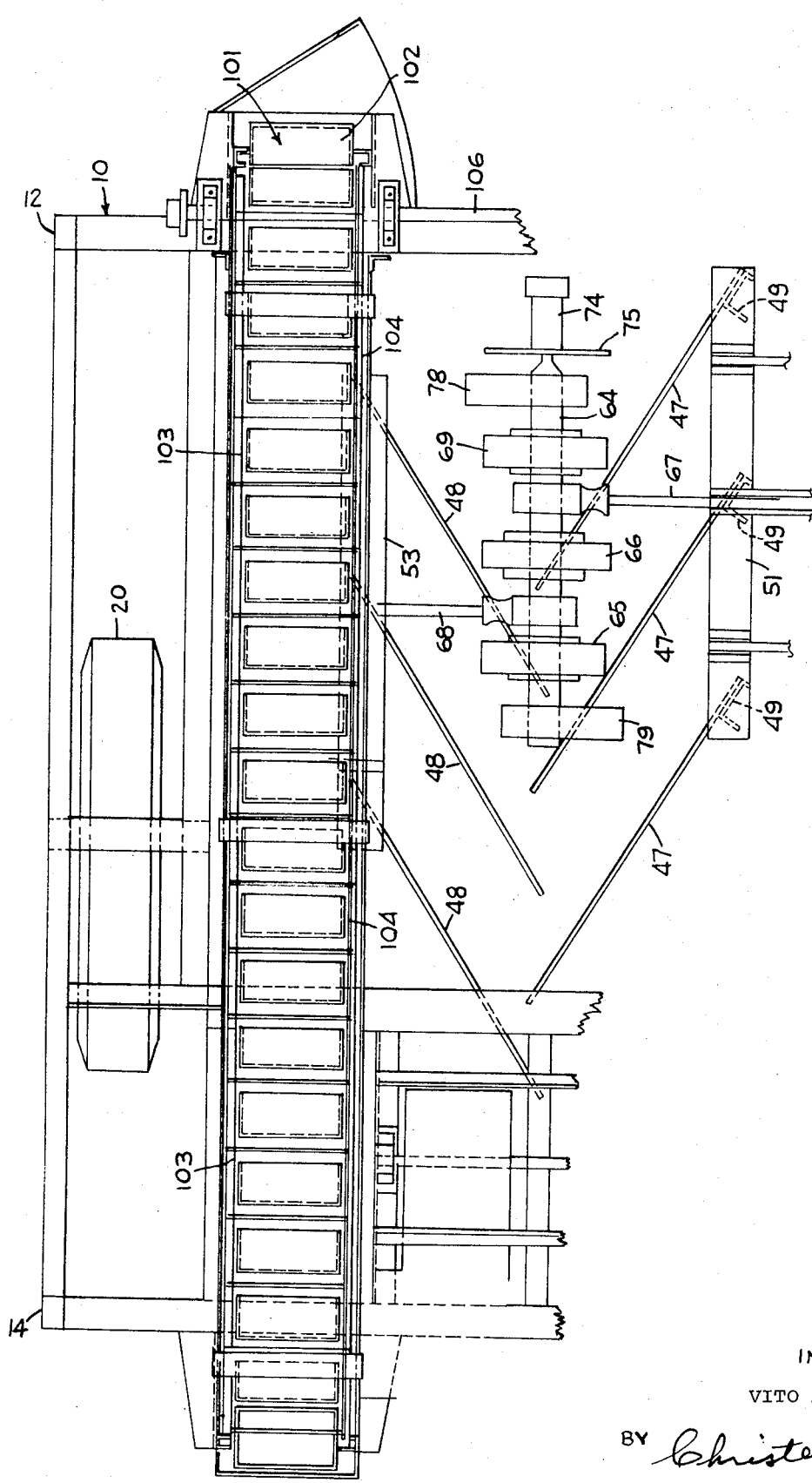
FIG. 3 is a fragmentary plan view of the harvesting machine of FIG. 1.

In the present illustration the beater elements 47 at one side of the machine are staggered with respect to the beater elements 48 at the opposite side of the machine so that, in effect, the foliage is pushed first in one direction and then the other as the machine moves along a row. In addition, the beater elements 47 and 48 at opposite sides of the machine are mounted and driven to move alternately away from each other and toward each other during machine travel for further agitating the foliage. Preferably, each beater element 47, 48 is elongated and disposed so that the longitudinal axis thereof extends rearwardly relative to the forward direction of travel of the machine, as shown in FIG. 3.

The means for mounting and moving the beaters at each side of the machine includes a pair of bell cranks 55 and 56 each pivoted to suitable brackets, for example clevis brackets, forming a fixed part of the machine framework, and the lower ends of the bell cranks 55, 56 are pivoted to similar brackets mounted on the beams 51 and 52. The bell cranks 55, 56 are pivotally connected by a vertical rod 60, which, together with the beater frame 49, 51, 52 forms a parallelogram linkage whereby the beater frame maintains a substantially vertical position during movement toward and away from the center line of the machine. A similar arrangement is included at the right-hand side of the machine. There are two longitudinal spaced sets of bell cranks 55 and 56 on each side of the machine, and they are connected by longitudinal tie rods 61 and 62 which synchronize the longitudinally spaced bell cranks and thus further assure maintenance of the beater frame in a vertical plane during its reciprocating movement.

A crank shaft 64 is journalled in the machine framework at spaced locations therealong, and has a pair of opposed throws which reciprocate connecting rods 67 and 68 simultaneously in opposite directions. The outer ends of the connecting rods 67 and 68 are pivoted to clevis brackets fixed to beams 51 and 53. Crankshaft 64 is rotated by means of a hydraulic motor or similar drive means (not shown), and as a result, the beater frames and corresponding beater elements 47, 48 fixed thereto are moved simultaneously toward and away from the center line of the harvesting machine. A more detailed description of the foregoing illustrative shaker means can be obtained in my pending application CHRISTEL & BEAN docket no. 2168, Ser. No. 165,083 filed July 23, 1971 entitled FOLIAGE AGITATING MEANS FOR HARVESTING MACHINES and assigned to the same assignee of the present invention. It should be understood, however, that the conveyor system of the present invention can be included on harvesting machines which are provided with various other types of crop removing means, shaker means, or foliage agitating means.

Figure 1:
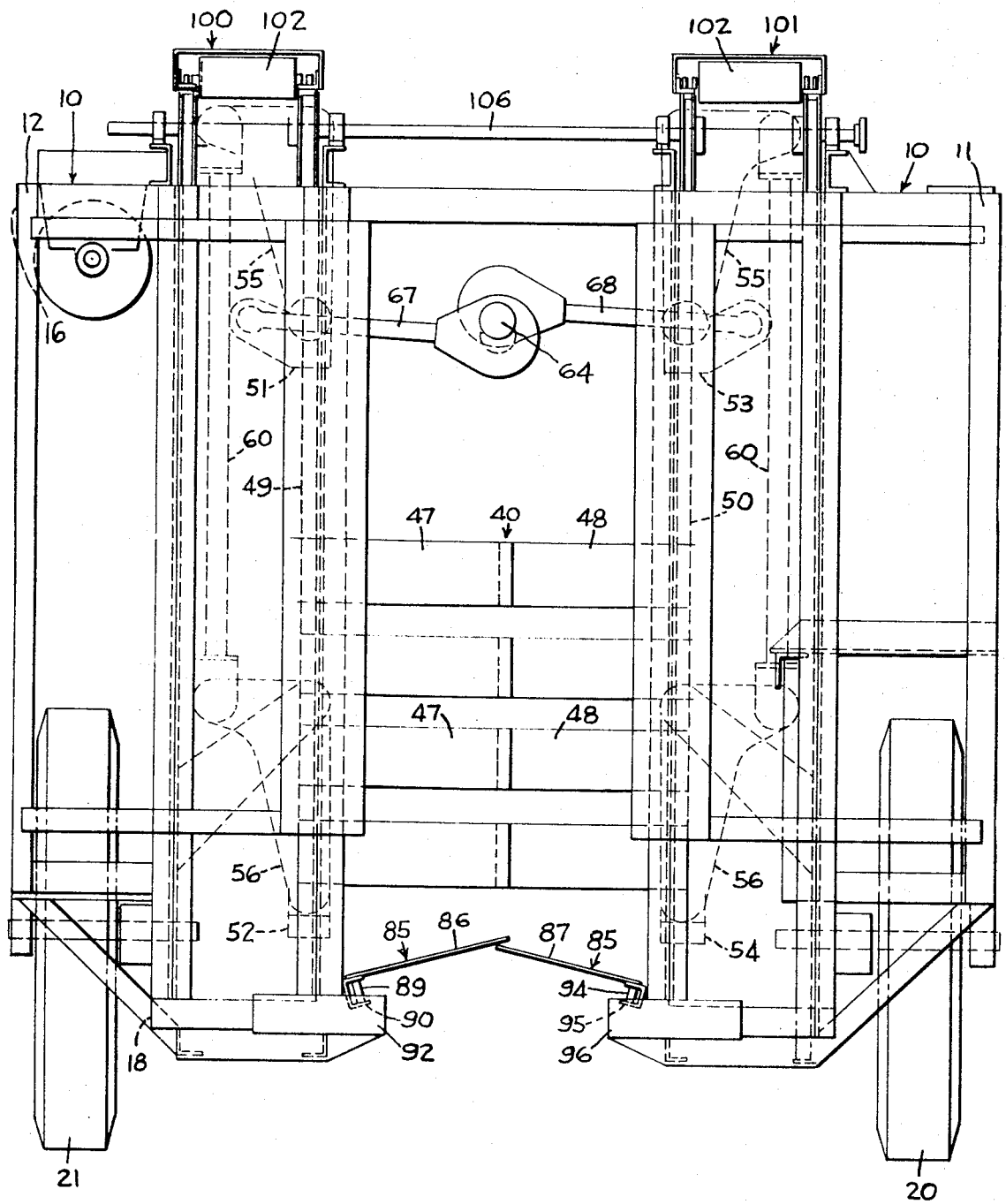
FIG. 1 is a fragmentary elevational view of one end of a harvesting machine provided with a conveyor system according to the present invention.

The harvesting machine of the present invention includes a system whereby the crops, for example grapes, are being removed from the plants or vines by action upon being removed from the plants or vines by action of shaker means 40 first are directed to and collected generally in the lower region of the frame 10, then are conveyed to a zone or point preferably in the upper region of frame 10, and finally are collected by a suitable arrangement and transmitted or conveyed to storage receptacles. Such receptacles, of course, can be carried externally on the frame 10 or carried by a separate vehicle moving along side the frame 10. Referring now to FIG. 1, a floor 85 comprises a plurality of opposed shutters, two of which are indicated at 86 and 87, which are disposed in a generally "herring-bone" fashion along the direction of travel of the machine. Since such flooring arrangements are well-known in the art, a brief description is deemed to be sufficient. Each shutter, for example shutter 86, is pivotally mounted on a pin 89 which is connected in a channel member 90 which, in turn, is mounted on an inwardly directed portion 92 of a lower member of machine frame 10. Shutter 87 shown in FIG. 1 is connected by a similar arrangement including pin 94, channel member 95 and frame portion 96. Each shutter is held in a normally closed position by a coil spring (not shown) connected thereto and to the channel member. As a result, the shutters progressively and yieldingly open and close about the plant stems or vines as the machine travels along a row of plants. As shown in FIG. 1, the shutters 86, 87 extend outwardly and downwardly from the center of the machine to assure that crops which fall onto flooring 85 are directed toward the conveyor system which now will be described.

The conveyor includes two spaced-apart paths 100, 101 defined by an arrangement of rails or tracks each of which paths, in turn, includes spaced-apart generally horizontal and vertical portions so as to be substantially rectangular. Each path includes a plurality of buckets, one being designated generally at 102, for carrying harvested crops such as grapes, and the buckets of each path are moved by an endless chain, such as chains 103, 104, connected to the buckets and to a drive means. The latter comprises a conveyor drive motor and flywheel 105 mounted on machine frame 10 which is drivenly coupled to chains 103, 104 by a shaft 106 and an arrangement of sprockets (not shown).

The lower portions of the conveyor paths are at a level whereby crops moving outwardly along flooring 85 are received by the conveyor buckets upon leaving the outermost edges of the flooring members. The buckets travel in a crop carrying position along the lower portion of the frame 10 to the end remote from shaker 40, as best seen in FIG. 2, whereupon they travel upwardly in a generally vertical direction for a distance substantially equal to the height of machine frame 10. In the upper right hand corner of frame 10 as viewed in FIG. 2, the buckets are pivoted so as to discharge or dump their contents into an arrangement for collecting the crops and transferring them from the machine. One preferred arrangement includes a housing member 110 below which is located a conveyor belt (not shown) which is trained around a plurality of driven rollers two of which are designated 111 and 112. The conveyor belt can extend out from the harvesting machine to separately carried bins or receptacles or, alternatively, such receptacles can be carried by frame 10.

FIGS. 4–8 illustrate in further detail the conveyor system provided by the present invention. The system includes a plurality of buckets 102 extending around the entire length of each of the paths 100 and 101, each bucket 102 includes a bottom 121 and first and second spaced-apart, vertically disposed end walls 122 and 123. The bucket is completed by first and second side walls 124, 125 which in this particular illustration extend outwardly at different angles relative to the bottom of the bucket. Sidewall 125, which can be designated forward in terms of the direction of travel of the machine, extends outwardly at a greater angle. The buckets 102 also advantageously are made of relatively rigid nonporous material such as metal, for example aluminum, or suitable plastic. The conveyor system paths 100 and 101 each include upper and lower horizontal portions and first and second vertical portions. For example, FIGS. 4 and 5 show junctions of one of the vertical portions with each of the upper and lower horizontal portions, respectively. The defining means for each path comprise pairs of spaced-apart parallel and substantially coplanar rails, such as rails 128, 129 of the upper horizontal portion of paths 100, 101 shown in FIG. 6 and rails 131, 132 of both vertical portions of paths 100, 101 shown in FIG. 7. FIG. 8 shows one rail 134 of the pair included in the lower horizontal portion of paths 100 and 101. The rails 128, 129, 131, 132 and 134 are fixed to machine frame 10, and the horizontal rails are generally parallel to the direction of travel of the machine.

The system further includes a plurality of bucket supporting means rotatably connected to corresponding buckets at the end walls thereof and adapted to contact and move along the path defining means. In the preferred form each bucket is provided with a supporting means comprising a rod 140 which is rotatably received near each end thereof in corresponding bucket end walls 122, 123 as shown in FIG. 6. The supporting means also includes first and second bearing means or supporting rollers 141 and 142 which are rotatably connected to rod 140 at each end thereof and spaced from the outer surface of the corresponding bucket end walls 122 and 123, respectively, as shown in FIGS. 6–8. The supporting rollers 141, 142 are spaced-apart the correct distance so as to contact and move along the rails 128, 129, 131, 132 and 134 which comprise the conveyor path defining means for paths 100 and 101.

The conveyor system is provided with an endless chain connected to each of the buckets, and preferably two chains 103, 104 are included in each path 100 and 101 and connected to buckets 102 adjacent end walls 122, 123 such as by connection to rod 140. The chains are connected through sprockets (not shown) to shaft 106 which is rotatably supported on the machine frame and driven by motor 105 mounted on the machine frame as shown in FIG. 2. Chains 103 and 104, for example, can be of the type commercially designated Rex-C2050 1¼ inch pitch hollow pin roller chain having Delrin rollers. The buckets 102 travel through a substantial portion of each path 100, 101 in a position whereby they carry the harvested material, and are pivoted to a discharge position through another portion of each path. This is accomplished by means carried by each bucket 102 for engaging co-operating means on the machine frame which now will be described.

Referring now to FIGS. 4, 5 and 8 each bucket 102 is provided with a link member 144, one end of which is pivotably or rotatably connected on rod 140 between roller 142 and the roller of chain 103, as shown in detail in FIG. 8. A second roller 148 is connected to the other end of link 144 by means of a pin 150 which extends through link 144 and roller 148 and is secured at one end thereof in bucket end wall 123. Roller 148 therefore is rotatable about pin 150, and in the present illustration pin 150 is displaced from rod 140 through about a 90 degree angle toward the bucket bottom 121. Preferably an identical arrangement of link, roller and pin is provided also on the opposite end wall 122 of each bucket 102.

Rail 134 and its companion member (not shown) defining the lower horizontal portion of each path 100, 101 each are of L-shaped cross section. The rails are of a size and are positioned in the machine frame 10 so that the horizontal legs thereof are contacted or engaged by only the supporting rollers 141, 142 of each bucket. As a result, buckets 102 are in a carrying position with the bottoms 121 thereof generally horizontal and with links 144 generally vertical as illustrated in FIGS. 5 and 8. The buckets 102 remain in this carrying position along the entire lower horizontal portion of each path 100, 101 and also along the vertical portions of paths 100, 101 as illustrated in FIG. 5. Rails 131 and 132 each include two legs extending inwardly at right angles from a web portion, and this configuration facilitates guiding of buckets 102 during their vertical travel. Link 144 remains generally vertical as it and the rollers travel along the vertical rails 131 and 132.

Rail members 128 and 129 defining the upper horizontal portion of each path 100, 101 also are of L-shaped cross section. These rails, however, are of a size and are positioned in the machine frame 10 so that the horizontal legs thereof are contacted or engaged both by the supporting rollers 141, 142 and by link 144 and roller 148. As a result, buckets 102 are pivoted to a discharging position with the bottom 121 thereof generally vertical and with links 144 generally horizontal as illustrated in FIG. 4. In particular, the horizontal legs of rail members 128, 129 first are contacted by link 144 and then by roller 148, and buckets 102 are pivoted about the axis of rod 140 by virtue of the connection of rod 140 through link 144, roller 148 and pin 150 to a point spaced from rod 140 on the bucket end wall. Buckets 102 remain in this discharging position as they travel toward the front of the machine along the entire upper horizontal portion of each path, whereupon they are again pivoted and travel down the other vertical portions of paths 100, 101 in preparation for another collection cycle as illustrated in FIG. 2.

In operation, the harvesting machine is moved, for example by a tractor, through a field of bushes or vines planted in rows in a manner whereby the vines or bushes are straddled by the machine frame 10 and, hence, by shaker means 40. Vibratory or agitating motion is imparted by the beater elements 47, 48 to the bushes or vines contacted thereby as previously described causing the crops, for example grapes, to be removed therefrom whereupon they fall to the flooring 85. The inclined floor members direct the crops outwardly from the region of the center of the machine to conveyor buckets 102 traveling through the lower horizontal portions of the conveyor system paths 100, 101 at each side of the flooring 85. As shown more clearly in FIG. 2, the crops then are conveyed, relative to the machine, rearwardly from shaker means 40 in a generally horizontal direction, whereupon they are conveyed vertically into proximity with the crop collector 110. At this point the conveyor buckets 102 are pivoted to a discharge position by the arrangement previously described and the crops discharged therefrom are conveyed from the machine by the belt (not shown) to the afore-mentioned storage receptacles. The buckets 102 continue to travel in a discharge position along the upper horizontal paths toward the front of the machine whereupon they return vertically to the lower horizontal portion of the paths in the vicinity of shaker means 40 where they are returned to a carrying position to receive additional crops.

By virtue of the arrangement of pivotally supported buckets, the harvesting machine conveyor system of the present invention advantageously employs metal buckets without sacrificing the overall efficiency of the system. The metal buckets 102, being relatively nonporous, do not absorb dust, dirt or liquid and thus require relatively infrequent cleaning during use. Therefore, a harvesting machine provided with a conveyor system of the present invention can be operated for a significantly longer time before washing of the conveyor buckets becomes necessary as compared to harvesting machine conveyor arrangements heretofore available.

The simple arrangement whereby buckets 102 are pivoted through about a 90 degree angle from a carrying position to a discharging position together with the inclined side walls 124, 125 of the buckets insures total removal of crops from the buckets. It will be noted from an inspection of FIG. 2 that the buckets are pivoted to a discharge position throughout half of each conveyor path 100, 101. This plus the relatively nonporous metal of which buckets 102 are formed maximizes removal of unwanted dirt and other matter from the buckets subsequent to their discharge of harvested material and prior to their receiving newly harvested material upon reaching the lower portion of the conveyor path. The pivoting arrangement of the present invention, moreover, enables a substantially rectangular conveyor path to be utilized which, in turn, maximizes the conveyor working length for a given machine size. The fact that the pivotally supported buckets 102 travel in horizontal and vertical paths while in a carrying position insures little or no crop spillage prior to discharge. Fixedly supported buckets traveling through an inclined path, on the other hand, can be relatively more susceptible to crop spillage. In addition, the relatively simple conveyor arrangement of the present invention is mechanically easy to assemble and maintain.

I claim:

1. In a harvesting machine including an ambulatory supporting frame adapted for movement along a row of plants and having means for removing crops from the plants, a conveyor system comprising:
   a. means on said frame defining a conveyor path having a first supporting surface portion adjacent said crop removing means and a second supporting surface portion beyond said crop removing means, said supporting surface having an inwardly projecting portion;
   b. a plurality of buckets for receiving and carrying removed crops, each of said buckets including supporting means pivotally connected thereto and engaging said path defining means along the entire length of the path for movement along said conveyor path;
   c. means for moving said buckets along said conveyor path; and
   d. pivoting means comprising link means fixed to each of said buckets and pivotally connected at one end to said supporting means, said link means engaging the inwardly projecting portion of said second supporting surface portion of said path defining means whereby said buckets are in a position carrying crops along the portion of said path adjacent said crop removing means and said buckets are pivoted to a position discharging crops along the portion of said path beyond said crop removing means.

2. A conveyor system as defined in claim 1 wherein said buckets are of relatively rigid nonporous material.

3. A conveyor system as defined in claim 1 wherein said conveyor path portions adjacent and spaced from said crop removing means comprise lower and upper horizontal path portions, respectively, relative to said frame and wherein said path defining means includes spaced apart portions connecting said upper and lower portions.

4. A conveyor system as defined in claim 1 wherein said frame has a configuration enabling said machine to straddle a row of plants and further including means on said frame defining a second similar conveyor path whereby said conveyor paths are located on opposite sides of the row of plants.

5. A conveyor system as defined in claim 1 wherein said bucket supporting means for each bucket comprises a rod pivotally connected to said bucket and a pair of bearing means rotatably connected on said rod adjacent opposite ends thereof for engaging said path defining means.

6. A conveyor system as defined in claim 1 wherein said path defining means comprises spaced apart parallel rails positioned on said frame to provide upper and lower horizontal conveyor path portions connected together by spaced apart vertical portions.

7. A conveyor system as defined in claim 6 wherein said bucket supporting means for each bucket comprises a rod pivotally connected to said bucket and a pair of rollers rotatably connected on said rod adjacent opposite ends thereof for engaging said path defining means.

8. In a harvesting machine including an ambulatory supporting frame adapted for movement along a row of plants removing having means for ermoving crops from the plants, a conveyor system comprising:
   a. means on said frame defining a conveyor path having a portion adjacent said crop removing means and a portion spaced from said crop removing means;
   b. a plurality of buckets for receiving and carrying removed crops, each of said buckets including supporting means engaging said path defining means for movement along said conveyor path, said supporting means for each bucket comprising a rod pivotally connected to said bucket and pair of bearing means rotatably connected on said rod adjacent opposite ends thereof for engaging said path defining means;
   c. means for moving said buckets along said conveyor path; and
   d. pivoting means on said buckets for engaging cooperating means on said frame during a portion of the movement of said buckets along said conveyor path, said pivoting means comprising a link pivotally connected at one end to said rod and fixed at the other end to said bucket at a point spaced from the pivotal connection of said rod to said bucket, said path defining means engaging said link along said conveyor path portion spaced from said crop removing means, whereby said buckets are in a position carrying crops along the portion of said path adjacent said crop removing means and said buckets are pivoted to a position discharging crops along the portion of said path spaced from said crop removing means.

9. A conveyor system as defined in claim 8 wherein said bucket moving means comprises a roller chain connected to each bucket on said supporting rod thereof adjacent said bucket and said supporting bearing whereby the rollers of said chain and said link engage said path defining means when pivoting of said buckets is to occur.

10. In a harvesting machine including an ambulatory supporting frame adapted for movement along a row of plants and having means for removing crops from the plants, a conveyor system comprising:

a. means on said frame defining a conveyor path having a portion adjacent said crop removing means and a portion spaced from said crop removing means, said path defining means comprising spaced apart parallel rails positioned on said frame to provide upper and lower horizontal conveyor path portions connected together by spaced apart vertical portions;

b. a plurality of buckets for receiving and carrying removed crops, each of said buckets including supporting means engaging said path defining means for movement along said conveyor path, said bucket supporting means for each bucket comprising a rod pivotally connected to said bucket and a pair of rollers rotatably connected on said rod adjacent opposite ends thereof for engaging said path defining means;

c. means for moving said buckets along said conveyor path; and d. pivoting means on said buckets for engaging cooperating means on said frame during a portion of the movement of said buckets along said conveyor path, said pivoting means comprising a link pivotally connected at one end to said rod and fixed at the other end to said bucket at a point spaced from the pivotal connection of said rod to said bucket and wherein said rails providing said upper horizontal conveyor path portion are positioned on said frame and of sufficient size to engage said link along the upper path portion, whereby said buckets are in a position carrying crops along the portion of said path adjacent said crop removing means and said buckets are pivoted to a position discharging crops along the portion of said path spaced from said crop removing means.

11. A conveyor system as defined in claim 10 wherein said bucket moving means comprises a roller chain connected to each bucket on said supporting rod thereof between said bucket and said supporting roller whereby the rollers of said chain and said link engage said rails providing said upper horizontal conveyor path portion when pivoting of said buckets is to occur.

12. A conveyor system as defined in claim 1 wherein each bucket has a wall inclined outwardly relative to the bottom of the bucket for discharging crops and wherein each bucket is pivoted through an angle of about ninety degrees for discharging crops.

* * * * *